United States Patent [19]

Matsuoka et al.

[11] Patent Number: 4,665,458
[45] Date of Patent: May 12, 1987

[54] ACCELERATION POWER SUPPLY

[75] Inventors: Mamoru Matsuoka, Ibaraki; Osamu Higa, Tokyo, both of Japan

[73] Assignees: Japan Atomic Energy Research Institute, Tokyo; Kabushiki Kaisha Toshiba, Kawasaki, both of Japan

[21] Appl. No.: 654,118

[22] Filed: Sep. 29, 1984

[30] Foreign Application Priority Data

Sep. 27, 1983 [JP] Japan ................. 58-178596

[51] Int. Cl.⁴ .............................................. H02H 3/08
[52] U.S. Cl. ......................................... 361/18; 361/58; 361/91; 323/297; 323/354
[58] Field of Search ............... 323/297, 277, 294, 354; 361/18, 58, 91, 111

[56] References Cited

U.S. PATENT DOCUMENTS 3,611,031 10/1971 Lutz ................................... 361/58 X

FOREIGN PATENT DOCUMENTS 0075283 3/1983 European Pat. Off. .
2475839 8/1981 France .

OTHER PUBLICATIONS

A SCR Switched Capacitor Voltage Regulator for 150 KV Neutral Beam Power Supply K. A. Milnes et al., Aug. 1978.

An SCR Series Switch and Impulse Crowbar at the Lawrence Berkeley Laboratory for CTR Neutral Beam Source Development; J. V. Frank et al., Oct. 1977.

*Primary Examiner*—A. D. Pellinen
*Assistant Examiner*—Derek S. Jennings
*Attorney, Agent, or Firm*—Oblon, Fisher, Spivak, McClelland & Maier

[57] ABSTRACT

An acceleration power supply includes a series-connected semiconductor switches with voltage dividing elements and another semiconductor switch coupled in series to the series-connected semiconductor switches for cutting off a power supply line connected to a load of the apparatus. The series-connected semiconductor switches and cutting-off semiconductor switch have a function of a series regulator.

2 Claims, 5 Drawing Figures

ACCELERATION POWER SUPPLY

BACKGROUND OF THE INVENTION

1. Field of the Invention

The present invention relates to an acceleration power supply used, for example, in a neutral beam injector in a nuclear fusion reactor.

2. Discussion of Background

An acceleration power supply generates a very high DC voltage. Such a high DC voltage is used to accelerate ions in a plasma so that the neutralized ions are injected into fusion plasma etc. An ion source which is a load of the acceleration power supply is frequently short-circuited. The acceleration power supply should therefore have a function to detect such a short-circuit and to cut off at high speed the voltage supply to the load. A main configuration of a conventional acceleration power supply may be as shown in FIG. 1. Referring to FIG. 1, reference numeral 11 denotes a thyristor switch; 12, a transformer; 13, a rectifier; and 14, a filtering capacitor. A power tube 15 used for a series regulator applies a constantly-regulated voltage to a load 18 and, in an emergency, is cut off for safety. In order to restrict the plate dissipation of power tube 15 below the rated value, the triggering angle of thyristor switch 11 is so controlled that a voltage on capacitor 14 is always higher by a prescribed voltage than a load voltage applied to load 18. Then, the voltage drop across power tube 15 is substantially fixed.

The load voltage is controlled in the following manner. The control grid of power tube 15 is coupled via a power tube drive circuit 16 to a voltage control circuit 20. A control signal E20 from voltage control circuit 20 serves to control the power tube such that an output voltage signal E17 obtained from a voltage divider 17 becomes equal to a reference voltage signal E19 from a presetter 19. Output voltage signal E17 is proportional to the load voltage and, therefore, the load voltage is automatically follows the value of reference voltage signal E19. When control signal E20 is supplied to power tube drive circuit 16 and the grid voltage of power tube 15 is set at a prescribed value, a given constant load voltage is obtained. In order to apply a stable voltage to load 18, a high-speed control operation for power tube 15 is required.

Incidentally, power tube 15 is also used to quickly cut off an over current to load 18 when a short-circuit of load 18 is detected.

Generally speaking, the frequency response of power tube 15 extends beyond several megahertz or more. For this reason, when the response speed of each of voltage control circuit 20 and power tube drive circuit 16 is designed to be fast, the total response speed of the automatic voltage control loop is substantially determined by the time constant of load 18. This time constant is generally formed of a capacitance component and resistance component of load 18 (not shown).

Thyristor switch 11 also has a function to control the voltage on capacitor 14. However, the response speed of thyristor switch 11 is much lower than that of power tube 15. In addition, thyristor switch 11 does not have a function to positively decrease the voltage on capacitor 14. This fact requires a high-speed control operation for power tube 15 in order that a stable output voltage is supplied to load 18.

Typical ratings of an acceleration power supply for a neutral beam injector for heating a plasma is, for instance,:
 output voltage = 100 kV;
 output current = 100A;
 rise time = several hundred microseconds; and
 cutoff time = about 20 microseconds.

The above ratings can be satisfied by the conventional system as shown in FIG. 1. However, in recent years, voltage and current ratings of acceleration power supply have been increasing and the above ratings are now insufficient in many cases. In view of this, it is necessary to connect a given number of power tubes in series and/or in parallel, or to use a special power tube having large voltage and current ratings, in order to satisfy the increased ratings. However, if the conventional system as shown in FIG. 1 is used in such cases, the following problems are invited.

A power tube having large voltage and current ratings is very expensive, has a very short filament life (generally below 3,000 hours), and tends to cause a flashover (short-circuit) within the power tube so that the reliability of the power supply becomes low. Further, when the working voltage is exceeds over around 10 kV, X-rays are generated and an X-ray shielding member being formed of a lead plate must be provided.

SUMMARY OF THE INVENTION

It is accordingly an object of the present invention to provide an acceleration power supply with high reliability and relatively long life.

To achieve the above object, the acceleration power supply of the invention does not depend on a power tube for a series regulator but uses, in stead of the power tube, a series-connected semiconductor switches with voltage dividing elements and another semiconductor switch, coupled in series to the series-connected semiconductor switches, for cutting off a power supply line connected to a load of the apparatus. The series-connected semiconductor switches and cutting-off semiconductor switch have a function substantially equivalent to the function of the power tube.

According to the present invention, an acceleration power supply may have a semipermanent life, an excellent reliability and an economic advantage.

Incidentally, the following prior art publications which provide useful information regarding the present invention are available:

(1) A SCR SWITCHED CAPACITOR VOLTAGE REGULATOR FOR 150 kV NEUTRAL BEAM POWER SUPPLY
 K. A. Milines et al.
 Lawrence Berkeley Laboratory
 University of California
 August 1978; and (2) AN SCR SERIES SWITCH AND IMPULSE CROWBER AT THE LAWRENCE BERKEKEY LABORATORY FOR CTR NEUTRAL BEAM SOURCE DEVELOPMENT
 J. V. Franck et al.
 Lawrence Berkeley Laboratory
 October 1977.

All disclosures of the above publications are now incorporated in the present application.

BREIF DESCRIPTION OF THE DRAWINGS

FIG. 1 is a circuit diagram showing a conventional acceleration power supply;

FIG. 2 a circuit diagram showing the configuration of an acceleration power supply according to an embodiment of the present invention;

FIG. 3 is a detailed circuit diagram of part 40 of the circuit shown in FIG. 2;

FIGS. 4(a) and 4(b) are graphs explaining the mode of operation of the above embodiment; and FIG. 5, shows a partial modification of the circuit in FIG. 2.

DETAILED DESCRIPTION OF THE PREFERRED EMBODIMENT

Figure 1:
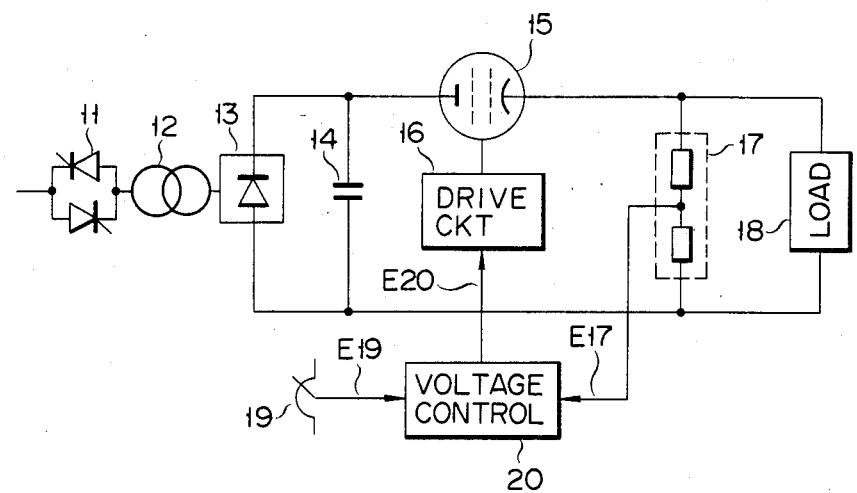

The present invention will now be described in detail with reference to FIG. 2 wherein the same reference numerals denote the same parts as in FIG. 1.

Figure 2:
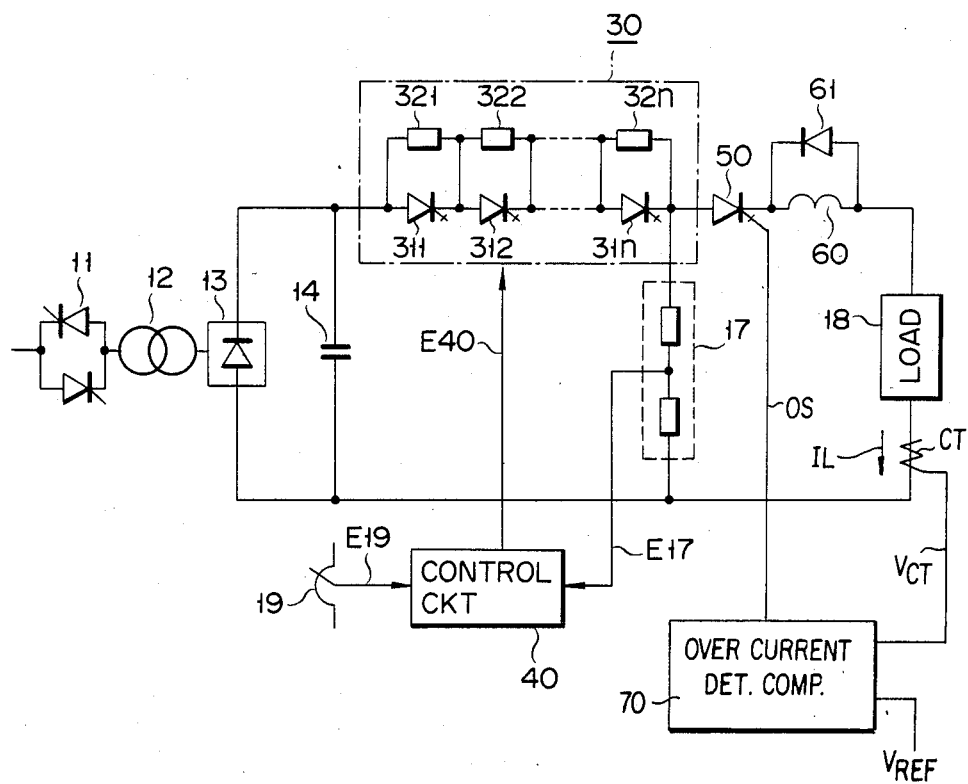

Referring to FIG. 2, reference numeral 11 denotes a thyristor switch; 12, a transformer; 13, a rectifier; 14, a filtering capacitor; 17, a voltage divider; and 19, a voltage presetter for presetting an output voltage. Since these parts have the same functions as those in FIG. 1, they will not be described.

A series regulator circuit 30 is inserted between a DC power supply (11 to 14) and load 18 and is formed of a plurality of series-connected semiconductor switches 311, 312, ..., 31n and a plurality of voltage dividing elements 321, 322, ..., 32n. Each of these semiconductor switches may be a gate turn-off thyristor (GTO). Each of these voltage dividing elements may be a non-linear resistance element such as a varistor. Voltage dividing elements 321, 322, ..., 32n are connected in parallel to GTOs 311, 312, ..., 31n, respectively.

The voltage applied to load 18 is regulated by ON-/OFF controlling the GTOs 311 to 31n. This ON/OFF control is performed by a control circuit 40. When the voltage on load 18 exceeds a target value corresponding to reference voltage signal E19, control circuit 40 supplies a control signal E40 containing an OFF instruction to one of GTOs 311 to 31n (e.g., 311). Then, the voltage applied to load 18 is decreased by a voltage drop appearing across the voltage dividing element 321. When the load voltage is still much higher than the target value, control circuit 40 supplies signal E40 containing another OFF instruction to GTO 312. In this manner, control circuit 40 controls the voltage on load 18 to obtain the target value.

Figure 3:
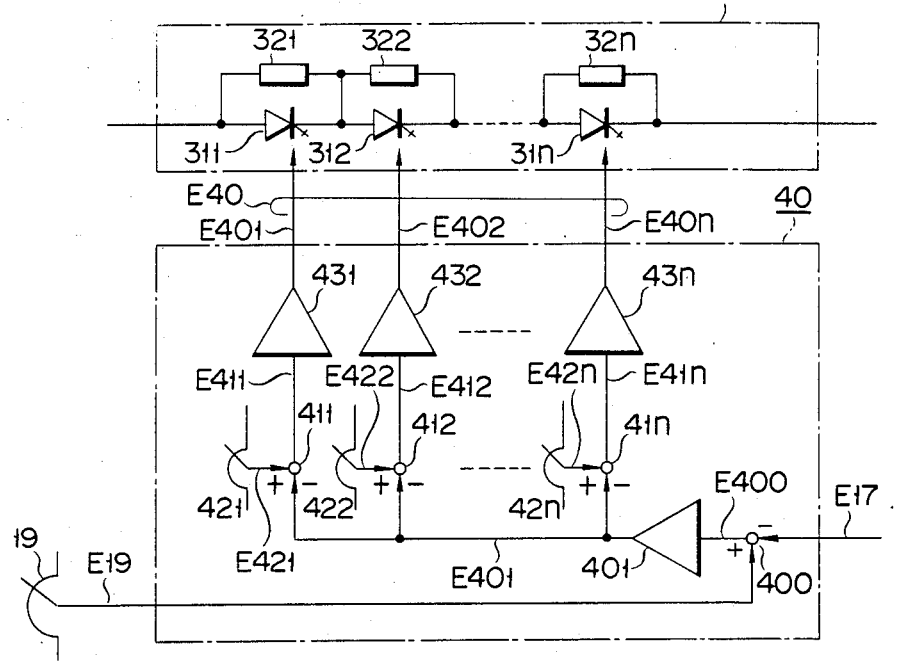

FIG. 3 is a circuit diagram showing the configuration of control circuit 40. Reference voltage signal E19 determining the target value of the load voltage is obtained from voltage presetter 19. Reference voltage signal E19 is supplied to the positive input of a difference detector 400. The negative input of detector 400 receives output voltage signal E17 from voltage divider 17 (FIG. 2). Detector 400 provides a signal E400 corresponding to the difference between signals E19 and E17. Signal E400 is supplied to a comparator 401 having a given threshold level. Comparator 401 generates a comparison output signal E401 when signal E400 with a certain level is inputted. Signal E401 is supplied to the negative input of each of difference detectors 411 to 41n. Respective positive inputs of detectors 411 to 41n receives independent reference voltage signals E421 to E42n from presetters 421 to 42n. Detectors 411 to 41n provide difference signals E411 to E41n, respectively. Signal E411 is supplied to a comparator 431 having a given input threshold level. When the supplied signal E411 has a certain level, comparator 431 generates a trigger signal E401 and this signal E401 is supplied as a part of control signal E40 to the gate of GTO 311.

Similarly, signals E412 to E41n are respectively supplied to comparators 432 to 43n each having a given input threshold level. When the supplied signals E412 to E41n have certain levels, comparators 432 to 43n generate trigger signals E402 to E40n and these signals E402 to E40n are respectively supplied as a part of control signal E40 to the gates of GTOs 312 to 31n.

The mode of operation of the FIG. 3 circuit will now be described.

The circuit elements 30, 17 and 40 in FIG. 2 constitute a closed negative feedback loop whose control target is given by presetter 19. According to the negative feedback loop operation, the voltage of signal E400 in FIG. 3 becomes substantially zero. Namely, comparator 401 supplies signal E401 to detectors 411 to 41n so that reference voltage signal E19 supplied from presetter 19 becomes equal to output voltage signal E17.

Presetters 421 to 42n respectively supply comparators 411 to 41n with independent and weighted reference voltages. The weighting for these reference voltages are so determined that they respectively correspond to the voltage dividing ratios of voltage dividing elements 321 to 32n.

Figure 4:
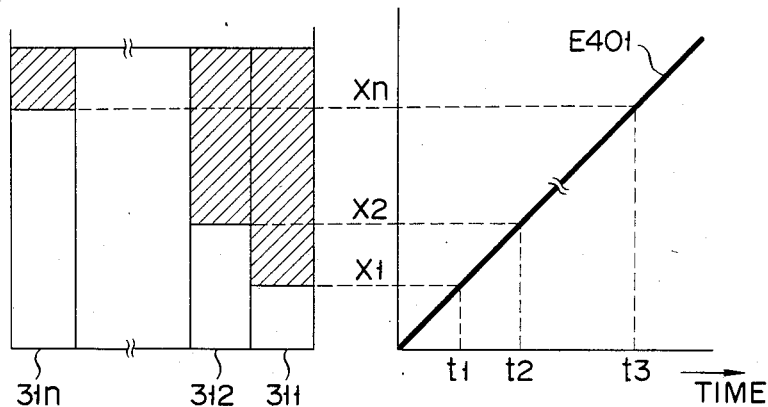

FIGS. 4(a) and 4(b) show the relation between the conduction state of GTOs 311 to 31n and the potential of signal E401 in FIG. 3. FIG. 4(a) shows a potential change of signal E401 along time t. An example will be considered wherein, as time t elapses, the potential of signal E401 increases and the voltage on load 18 is increased. In this case, at time t1, when the potential of signal E401 reaches a threshold potential X1 (E421) of detector 411, comparator 431 generates trigger signal E401 containing an ON instruction and supplies the ON instruction to GTO 311. When the potential of signal E401 exceeds the potential X1 but it falls below a threshold potential X2 (E422) of detector 412 (E421 <E401 <E422), only GTO 311 is ONed and all other GTOs 312 to 31n are OFFed. When the potential of signal E401 further increases and reaches the threshold potential X2 of detector 412 at time t2 (E421 <E401 =E422), comparator 432 supplies signal E402 containing an ON instruction to GTO 312. In this case, GTOs 311 and 312 are ONed and all other GTOs 313 to 31n are OFFed. In this manner, as the potential of signal E401 increases, control signals E401 to E40n containing ON instructions are sequentially supplied to GTOs 311 to 31n. As the number of ONed GTOs in circuit 30 increases, the voltage drop across the both ends of circuit 30 decreases. Thus, the voltage applied to load 18 (FIG. 2) can be controlled according to the potential of signal E401, and the potential of signal E401 can be freely determined by presetter 19.

In FIG. 2, a semiconductor switch (GTO) 50 is series-connected to series regulator circuit 30 and has a function to cutoff the load current when short-circuiting occurs at the load side. A current transformer CT for sensing the magnitude of a load current IL is arranged at the circuit (current path) of load 18. An output voltage $V_{ct}$ from current transformer CT is compared with a given current detection voltage $V_{ref}$ in an over current detection comparator 70. When the magnitude of voltage $V_{ct}$ from current transformer CT exceeds given current detection voltage $V_{ref}$, over current detection comparator 70 supplies an OFF signal OS to GTO 50 so that the current path of load 18 is cut off.

Figure 5:
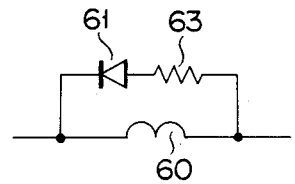

A reactor 60 is connected in series to GTO 50. Reactor 60 serves to suppress a transient overcurrent when load 18 is short-circuited. A diode 61 is parallel-connected to reactor 60. Diode 61 serves to circulate the current which has been flowing through reactor 60 when the load current is cut off, thereby preventing generation of an excessive-counterelectromotive force from reactor 60. When the decay time of the circulating current flowing through diode 61 should fall within a predetermined period of time, a resistor 63 may be connected in series to diode 61, as shown in FIG. 5.

The mode of operation of the circuit shown in FIGS. 2 and 3 will be described. First, the control angle of thyristor switch 11 is properly adjusted to determine the voltage on capacitor 14, so that a desired voltage is applied to load 18. When load 18 is short-circuited, GTO 50 is instantaneously cut off, and the load current becomes zero. Thereafter, the voltage on capacitor 14 is increased by energy stored in the inductance of transformer 12 etc. Then, the potential of output voltage signal E17 from voltage divider 17 exceeds the potential of reference voltage signal E19. Control circuit 40 responds to this (E17>E19) and supplies control signal E40 containing an OFF instruction to series regulator circuit 30. One or more of ONed semiconductor switches among GTOs 31l to 31n is turned off by this control signal E40.

When the short-circuit at the load side is released and GTO 50 is turned on again, the load current flows through the voltage dividing element connected in parallel to the OFFed GTO and through the ONed GTO in circuit 30. After the turn-on of GTO 50, the voltage on capacitor 14 is gradually decreased. However, since control circuit 40 sequentially supplies control signal E40 containing ON instructions to the OFFed GTOs in circuit 30, the output voltage applied to load 18 is maintained constant. When the semiconductor switch in circuit 30 comprises GTO (gate turn-off thyristor), the switching frequency can be several tens of kilohertz or more. Thus, an acceleration power supply with practically sufficient high control speed can be obtained.

Assume that the working voltage of each of voltage dividing elements 32l to 32n is selected to be 1 kV and the number n of series connections of elements 32l to 32n is selected to be 20. Then, the voltage control range of series regulator circuit 30 becomes 20 kV and control pitch of the voltage is 1 kV. When the apparatus of FIG. 2 with the above assumption is applied to an acceleration power supply of 100 kV class, a voltage control accuracy of 1% (=1 kV/100 kV) order can be obtained. This is sufficient in practice.

In the embodiment shown in FIG. 2, a gate turn-off thyristor (GTO) is used for each of semiconductor switches 31l to 31n. However, a bipolar transistor or FET may also be used for the semiconductor switches in circuit 30. When GTOs are used, a high-speed control of the output voltage which fluctuates around a prescribed voltage corresponding to signal E19 can be performed. When the fluctuation of an input power source voltage for thyristor switch 11 is sufficiently small and only a surge voltage on capacitor 14 caused by the cutoff of the load current is to be absorbed, the semiconductor switch in circuit 30 may be a conventional thyristor (SCR). This is because, even when a short-circuit occurs in load 18, the load current is cut off by semiconductor switch 50, so that the current to the semiconductor switches in circuit 30 is temporarily cut off and all the semiconductor switches in circuit 30 are rendered turned off. Thereafter, control circuit 40 supplies an ON instruction to series regulator circuit 30 only, in correspondence with the voltage on capacitor 14.

When the impedance of load 18 is constant before or after short-circuiting the load 18, the load current and an increment in the voltage on capacitor 14 hold a predetermined relationship. In this case, voltage dividing elements 32l to 32n may be conventional linear resistors, not varistors.

As can be seen from the above description, according to the present invention, without requiring the use of a power tube, merely using semiconductor switches and voltage dividing elements, there is provided an acceleration power supply which has a high-speed voltage control function and a high-speed current cutoff function required for an acceleration power supply, which has a semipermanent life and which has excellent reliability and an economic advantage.

Incidentally, although not shown, the present invention may be applied to a parallel or shunt regulator in which a series circuit of a given resistor and the series-connected semiconductor switches of circuit 30 is coupled in parallel to voltage divider 17 or load 18. In such a shunt regulator, increase (or decrease) of a load current is cancelled by decrease (or increase) of a bypass current flowing through the series circuit of the resistor and circuit 30, thereby obtaining a regulated output voltage.

What is claimed is:

1. An acceleration power supply being adapted to a DC power source and a load, comprising:
    voltage regulation means coupled to said DC power source and said load, for controlling a voltage applied to said load, said voltage regulator means including a plurality of series connected regulator units each of which is formed of a switch element and a resistive element couple in parallel to said switch element;
    cutoff means coupled in series to said voltage regulator means and being responsive to the magnitude of a load current flowing through said voltage regulator means, for cutting off a current path formed between said DC power source and said load when the magnitude of said load current exceeds a predetermined value; and
    control means coupled to said load and to said voltage regulator means, and being responsive to the voltage applied to said load, for controlling the ON/OFF state of said switch element, so that the voltage applied to said load approaches a prescribed value;
    wherein said control means includes:
    first means coupled to said load for generating an output voltage signal corresponding to the voltage applied to said load;
    second means for generating a reference voltage signal which defines said prescribed value of the voltage applied to said load; and
    third means coupled to each of the switch elements of said voltage regulator means and being responsive to said output voltage singal and said reference voltage signal, for ON/OFF controlling of said switch elements, so that said output voltage signal becomes substantially equal to said reference voltage signal;
    wherein said third means includes:
    a main comparator circuit coupled to said first means and said second means, for generating a difference signal corresponding to the difference between said output voltage signal and said reference voltage signal; and a plurality of auxiliary comparator circuits coupled to said main comparator circuit, for respectively responding to given differential potentials of said difference signal and respectively generating independent control signals according to the differential potentials of said difference signal, said independent control signals being respectively supplied to said switch elements.

2. An apparatus according to claim 1, wherein the resistances of said resistive elements respectively correspond to the given different potentials of said difference signal.

* * * * *